(12) United States Patent
Sommer

(10) Patent No.: US 10,974,679 B2
(45) Date of Patent: Apr. 13, 2021

(54) ARRANGEMENT FOR A VEHICLE ROOF, VEHICLE ROOF FOR A MOTOR VEHICLE, AND MOTOR VEHICLE

(71) Applicant: Webasto SE, Stockdorf (DE)

(72) Inventor: Ulrich Sommer, Munich (DE)

(73) Assignee: WEBASTO SE, Stockdorf (DE)

( * ) Notice: Subject to any disclaimer, the term of this patent is extended or adjusted under 35 U.S.C. 154(b) by 60 days.

(21) Appl. No.: 16/106,166

(22) Filed: Aug. 21, 2018

(65) Prior Publication Data
US 2019/0061666 A1 Feb. 28, 2019

(30) Foreign Application Priority Data
Aug. 24, 2017 (DE) ...................... 10 2017 119 332.4

(51) Int. Cl.
| | | |
|---|---|---|
| *B60R 21/08* | (2006.01) | |
| *B62D 25/06* | (2006.01) | |
| *B60J 7/16* | (2006.01) | |
| *B60R 21/13* | (2006.01) | |
| *B60R 21/00* | (2006.01) | |

(52) U.S. Cl.
CPC .............. *B60R 21/08* (2013.01); *B60J 7/1642* (2013.01); *B60R 21/13* (2013.01); *B62D 25/06* (2013.01); *B60R 2021/0018* (2013.01)

(58) Field of Classification Search
CPC ................... B60R 21/08; B60R 21/13; B60R 2021/0018; B62D 25/06; B60J 7/1642
See application file for complete search history.

(56) References Cited

U.S. PATENT DOCUMENTS

| | | | |
|---|---|---|---|
| 5,167,296 A | 12/1992 | Schreier et al. | |
| 5,707,075 A | 1/1998 | Kraft et al. | |
| 5,775,726 A * | 7/1998 | Timothy | ............... B60R 21/013 280/730.1 |
| 6,189,960 B1 * | 2/2001 | Mumura | ............... B60J 7/0015 160/7 |
| 6,283,543 B1 | 9/2001 | Hahn et al. | |
| 6,520,572 B1 * | 2/2003 | Niederman | ............... B60J 7/06 180/281 |
| 6,783,174 B2 * | 8/2004 | Bohm | ................... B60J 7/0573 296/223 |

(Continued)

FOREIGN PATENT DOCUMENTS

| | | |
|---|---|---|
| DE | 4137749 A1 | 5/1993 |
| DE | 19851469 A1 | 5/2000 |

(Continued)

*Primary Examiner* — Paul N Dickson
*Assistant Examiner* — Joselynn Y Sliteris
(74) *Attorney, Agent, or Firm* — Fitch, Even, Tabin & Flannery, LLP

(57) ABSTRACT

An arrangement for a vehicle roof is provided having a roof element, which can be coupled to a roof body of a motor vehicle and permits a view through the vehicle roof, and a safety device, which is assigned to the roof element and which has a safety element and a drive which is configured to move the safety element relative to the roof body and to transfer same from a first, retracted state, in which the safety element is stowed in a predetermined manner, into a second, extended state, in which the safety element covers a surface portion on a lower side of the roof element in a predetermined manner and opposes penetration of a body through the roof element.

10 Claims, 2 Drawing Sheets

(56) References Cited

U.S. PATENT DOCUMENTS

| | | | |
|---|---|---|---|
| 7,114,769 B2 | 10/2006 | Storc et al. | |
| 7,393,047 B2 * | 7/2008 | Hirotani | B62D 25/06 296/214 |
| 8,459,696 B2 * | 6/2013 | Browne | B60R 21/08 180/282 |
| 8,807,646 B2 | 8/2014 | Grimm et al. | |
| 9,610,915 B2 | 4/2017 | Specht et al. | |
| 9,771,048 B2 * | 9/2017 | Min | B60R 21/214 |
| 10,399,527 B2 * | 9/2019 | Schutt | B60R 21/08 |
| 10,427,637 B2 * | 10/2019 | Raikar | B60R 21/013 |
| 10,449,923 B2 * | 10/2019 | Son | B60R 21/214 |
| 10,596,883 B2 * | 3/2020 | Bacon | B60J 1/2091 |
| 10,639,973 B2 * | 5/2020 | Sommer | B60R 21/06 |
| 10,730,367 B2 * | 8/2020 | Bacon | B60J 7/1642 |
| 2017/0015269 A1 | 1/2017 | Min et al. | |
| 2017/0267199 A1 | 9/2017 | Schütt et al. | |
| 2018/0162207 A1 | 6/2018 | Pike et al. | |
| 2019/0061492 A1 * | 2/2019 | Sommer | B60J 7/0015 |

FOREIGN PATENT DOCUMENTS

| | | |
|---|---|---|
| DE | 102008032378 B3 | 12/2009 |
| DE | 102011018151 A1 | 10/2012 |
| DE | 102015109862 A1 | 12/2016 |
| DE | 102016104780 A1 | 9/2017 |

* cited by examiner

ARRANGEMENT FOR A VEHICLE ROOF, VEHICLE ROOF FOR A MOTOR VEHICLE, AND MOTOR VEHICLE

CROSS-REFERENCE TO RELATED APPLICATIONS

This application claims priority from German Patent Application Number DE 10 2017 119 332.4, filed Aug. 24, 2017, which is hereby incorporated herein by reference in its entirety for all purposes.

FIELD

Arrangement for a vehicle roof, vehicle roof for a motor vehicle, and motor vehicle

BACKGROUND

The invention relates to an arrangement for a vehicle roof, and to a vehicle roof for a motor vehicle, which arrangement and vehicle roof both contribute to increased safety for vehicle occupants of the motor vehicle. In addition, the invention relates to a motor vehicle with a vehicle roof and such an arrangement.

Some motor vehicles have vehicle roofs with a cover which is designed, for example, to be displaceable in order to open a roof opening. The cover here is raised, for example, into a ventilation position before it is displaced further to the rear in the opening direction into an open position. Such an arrangement which permits deployment and displacement of a cover is described, for example, in the document DE 102011018151 A1.

Covers or sliding roofs are generally configured in respect of their strength for loads which occur in the driving mode, such that they can withstand vibrations, wind loads, thermal length changes and distortions of existing mechanics. However, covers and sliding roofs are not designed to protect individuals, who are possibly not wearing their seatbelts, from falling through the associated roof opening during an accident, in particular if the motor vehicle overturns.

The invention is therefore based on the object of providing an arrangement for a vehicle roof and a vehicle roof for a motor vehicle, which arrangement and vehicle roof both contribute to increased safety for vehicle occupants of the motor vehicle.

The object is achieved by the features of the independent patent claim. Advantageous developments are specified in the dependent claims.

SUMMARY

An arrangement according to the invention for a vehicle roof comprises a roof element which can be coupled to a roof body of a motor vehicle and permits a view through the vehicle roof, and a safety device which is assigned to the roof element. The safety device has a safety element which is movable relative to the roof body, and a drive means which is configured to move the safety element and to transfer same from a first, retracted state, in which the safety element is stowed in a predetermined manner, into a second, extended state, in which the safety element covers a surface portion on a lower side of the roof element in a predetermined manner and opposes penetration of a body through the roof element.

The described arrangement makes it possible to realize a safety system for a motor vehicle, which contributes to increased safety for vehicle occupants of the motor vehicle. Such a safety system can also be arranged on existing vehicle roofs or in existing motor vehicles with a corresponding roof element, and therefore, by means of retrofitting with the arrangement, safety of the respective motor vehicle can be increased.

The described arrangement is designed in such a manner that, in the event of an accident of the motor vehicle, not only are the forces which result from the mass of the roof element, for example in the form of a sliding roof, itself taken into consideration. Provision of the safety device also makes it possible to take into consideration forces which may originate from falling individuals who, during an accident, under some circumstances fall onto or against the roof element.

The described body which is intended to be protected against penetration through the roof element therefore represents in particular a human body with a corresponding mass which possibly acts on the roof element during an accident. In this connection, for example, forces which correspond to a weight having a mass of 200 kg or 500 kg or more occur depending on the speed. The described arrangement therefore makes it possible to realize vehicle roofs which, in addition to a convenient view through the roof element, are also configured to protect individuals who are not wearing seatbelts against falling through the roof element, for example in the event of the motor vehicle overturning.

The first state represents a state in which the safety element is stowed in a packed, rolled up or some other predetermined manner. In this first state, the safety element is preferably accommodated in a space-saving manner and does not cover any substantial region of the roof element. The second state represents a safety state in which the safety element is completely extended, spread out or unfolded such that a substantial region of the roof element is reliably and securely covered with the safety element.

Movement of the safety element can be carried out in particular independently of the roof element, which is realized, for example, as a sliding roof and is assigned to a roof opening in the vehicle roof. According to such a configuration, the safety device is not necessarily assigned to the movable roof element, but rather on the contrary to the roof opening, in order to contribute to increased safety of the motor vehicle. The described arrangement therefore also permits reliable protection for vehicle occupants of the motor vehicle against falling out through an opening of a sliding roof, irrespective of whether the vehicle roof is open and the roof opening is opened up or closed.

The arrangement therefore realizes a relatively simple and clear additional system for a vehicle roof and a motor vehicle, that contributes to protection against falling out of the motor vehicle in the event of overturning. It is therefore not required to structurally reinforce a kinematic arrangement and construction of the vehicle roof in order to contribute to increased safety for vehicle occupants.

According to a preferred development of the arrangement, the safety element is designed as a mesh or a fabric element. Such a mesh or fabric element contains, for example, metal wires, carbon fibers and/or plastics fibers, which form a sufficient degree of strength for the safety element such that, in the event of an accident of the motor vehicle, penetration of a human body through the roof element can be reliably and securely opposed. In this connection, the mesh or the fabric element can be designed with regard to the material used or blend of materials and/or in respect of the processing of the material in such a manner that it withstands a predetermined load value in order to be able to compensate for striking of a body thereagainst in the second state. In particular, during a configuration of the safety element and of the safety device, future legal regulations which, for example, define specifications for strength and load-bearing capacity for such a safety system are optionally taken into consideration.

The arrangement is configured in particular in such a manner that the safety device can be fixedly connected to the roof body of the motor vehicle in a form-fitting, force-fitting and/or integrally bonded manner. A secure and reliable support of the safety device on the motor vehicle can thereby be realized. For example, designated components of the safety device are adhesively bonded, screwed and/or welded to the roof body such that a particularly stable and secure support is formed. Alternatively or additionally, the safety device can be coupled to the roof body by means of riveting, pressing and/or further joining methods.

According to a preferred development of the arrangement, the safety device has a first and a second crossmember, between which the safety element is arranged and clamped. The safety element is in each case coupled by a respective end to one of the crossmembers and, in the first state, is packed in a space-saving manner between them. In the second state, the two crossmembers are spaced apart further from each other such that the safety element is extended and tensioned. The first crossmember is preferably configured to be fixedly connected to the roof body of the motor vehicle in a form-fitting, force-fitting and/or integrally bonded manner in order to form a secure support of the safety device on the motor vehicle. The second crossmember is configured to be moved along the lower side of the roof element by means of the drive means and to unfold or spread out the safety element.

According to a further preferred development of the arrangement, the drive means comprises a cylinder, a piston rod, a pipe system for conducting gas and a gas unit for providing and releasing gas. The piston rod is coupled at one end to the safety element and at the other end to the cylinder. The pipe system is coupled on one side to the cylinder and on the other side to the gas unit. By release of gas by means of the gas unit, the safety element can be moved from the first state into the second state and can be spread out promptly and reliably under the roof element.

The gas unit can comprise, for example, a gas container which is filled with compressed gas or a gas mixture which, in the event of an accident of the motor vehicle, is released and fed into the pipe system. The piston rod has, for example, a disc-shaped piston at the end which extends into the cylinder, and therefore the gas flowing through the pipe system enters the cylinder and pushes the piston in front of it and drives the piston rod and the safety element which is coupled thereto. Alternatively or additionally, the gas unit can have a pyrotechnic gas generator which, by priming by means of a primer, provides a gas or gas mixture for moving the safety element in the event of an accident. The drive means preferably comprises one or more gas valves which can realize a respective throttle function and can contribute to a controlled and safe spreading out of the safety element.

According to a particularly preferred development of the arrangement, the safety device has a receiving unit which comprises a crossmember and one or more fixing elements which are designed to secure the safety element in the second, extended state. This makes it possible to realize a more stable and safer second state of the safety element in which the safety element is extended or spread out and forms a reliable support for a body striking thereagainst such that penetration through the roof element is prevented or penetration is at least opposed.

The roof element of the arrangement is designed, for example, as a glass and/or plastics skin which is fixedly installed in the vehicle roof of the motor vehicle. It permits a view through the vehicle roof within the range of the light spectrum perceptible by people and is customarily not configured in respect of its strength to withstand an impact of a human body. By means of the described arrangement, penetration of a body through such a glass and/or plastics skin can be reliably and safely prevented or such a penetration can be at least opposed.

Alternatively, the roof element is designed as a displaceable cover which is movable relative to the safety device and the roof body in order selectively to close or to open up a roof opening in the vehicle roof. Both when the cover is open and when the cover is closed, the safety device contributes to the safety of vehicle occupants of the motor vehicle, by, in the event of an accident, covering the associated roof opening in the vehicle roof and, when a cover is opened, opposing falling of a body through the roof opening.

A vehicle roof according to the invention for a motor vehicle comprises a configuration of the previously described arrangement which is arranged in or on the vehicle roof. The arrangement is arranged in particular on a lower side of the vehicle roof, which lower side faces the vehicle interior in an operationally ready state of an associated motor vehicle. The vehicle roof also comprises, for example, frame parts and/or body elements which, as connection components, permit the vehicle roof to be attached to the roof body of the motor vehicle. Owing to the fact that the vehicle roof comprises one of the previously described configurations of the arrangement, described properties and features of the arrangement, to the extent relevant, are also disclosed for the vehicle roof, and vice-versa.

A motor vehicle according to the invention comprises a vehicle roof and a configuration of the previously described arrangement which is coupled to a roof body of the motor vehicle. Owing to the fact that the motor vehicle comprises one of the previously described configurations of the arrangement, described properties and features of the arrangement, to the extent relevant, are also disclosed for the motor vehicle, and vice-versa.

Exemplary embodiments of the invention are explained in more detail below with reference to the schematic drawings, in which:

BRIEF DESCRIPTIONS OF THE DRAWING

DETAILED DESCRIPTION

Elements of identical design or function are indicated by the same reference signs throughout the figures. For clarity reasons, it is possible that not all of the illustrated elements in all of the figures are indicated by associated reference signs.

Figure 1:
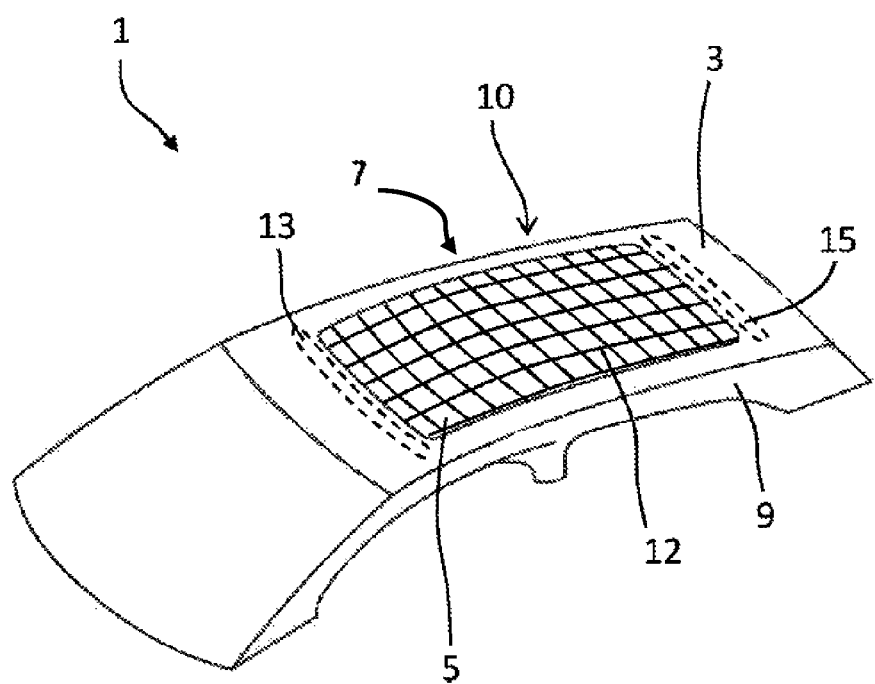
FIG. 1 shows a vehicle roof of a motor vehicle in a perspective view.
Figure 1:
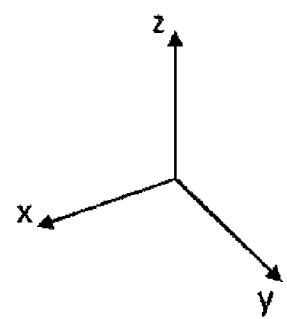

FIG. 1 shows schematically in a perspective view a motor vehicle 1 with a vehicle roof 3 which has a roof element 5. The roof element 5 is fixedly connected to a roof body 9 of the motor vehicle 1, for example by means of frame parts or coupling means, and realizes, for example, a fixed glass or fixed plastics element which is immovable with respect to the vehicle roof 3.

Alternatively, the roof element 5 is configured as a movable cover which is movable relative to the vehicle roof 3 in order to selectively open up or to close a roof opening in the vehicle roof 3. The roof element 5 in particular is configured as a component of the motor vehicle 1 which permits a view through the vehicle roof 3.

The motor vehicle 1 furthermore has an arrangement 10 which is arranged on a lower side of the vehicle roof 3, which lower side faces the vehicle interior. As will be explained with reference to FIG. 2 below, the arrangement 10 contributes to increased safety for vehicle occupants of the motor vehicle 1 and, in the event of an overturning, opposes falling out through the roof element 5 or through the roof opening in the vehicle roof.

The arrangement 10 comprises a safety device which is assigned to the roof element 5 and/or, with regard to a movable cover, to the roof opening. The safety device has a safety element 12 which is movable relative to the roof body 9, and a drive means 20 which is configured to move the safety element 12 and to transfer same from a first, retracted state, in which the safety element 12 is stowed in a predetermined manner, into a second, extended state, in which the safety element 12 covers a surface portion on a lower side of the roof element 5 in a predetermined manner and opposes penetration of a body through the roof element 5 or through the opened-up roof opening.

The first state represents a state in which the safety element 12 is stowed in a packed, rolled up or some other predetermined manner. In this first state, the safety element 12 is preferably accommodated in a space-saving manner, for example in a front region of the motor vehicle 1 above the windshield, and does not cover a substantial region of the roof element 5. The second state represents a safety state in which the safety element 12 is completely extended, spread out or unfolded, and therefore a substantial region of the roof element 5 or of the roof opening is reliably and safely covered with the safety element 12.

FIG. 1 illustrates the second state of the safety element 12 which is designed as a mesh which contains, for example, metal wires, carbon fibers and/or plastics fibers which realize a sufficient degree of strength of the safety element 12 such that, during an accident of the motor vehicle 1, penetration of a human body through the roof element 5 or through the roof opening is reliably and securely opposed. According to an alternative embodiment of the arrangement 10, the safety element 12 is designed as a fabric element.

The safety element 12 is designed with respect to the material used or the processed blend of materials in such a manner that it withstands a predetermined load value in order, in the second state, to be able to compensate for striking of a body thereagainst without said body penetrating the mesh or the safety element 12. The described arrangement 10 therefore also takes into consideration forces which may emanate from falling individuals who under some circumstances in the event of an accident fall onto or against the roof element 5 or in the direction of the roof opening. In this connection, forces which correspond to a weight having a mass of 200 kg or 500 kg or more can act on the safety element 12.

Figure 2:
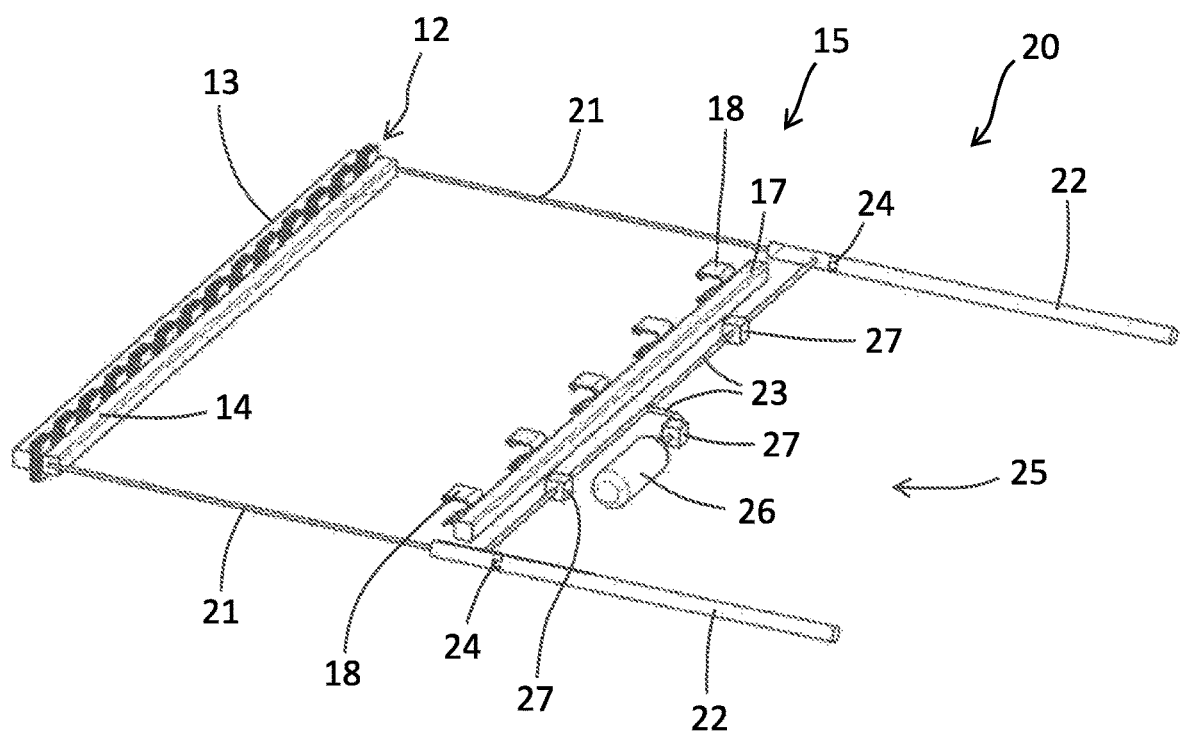
FIG. 2 shows an exemplary embodiment of an arrangement for a vehicle roof.

FIG. 2 shows schematically in a perspective view an exemplary embodiment of the arrangement 10 or of the safety device with the safety element 12 which, in the illustrated exemplary embodiment, is stowed in a zigzag-shaped manner between a first crossmember 13 and a second crossmember 14. Accordingly, FIG. 2 shows the first, packed state of the safety element 12.

The safety element 12 is in each case coupled by a respective end to one of the crossmembers 13, 14. The first crossmember 13 is fixedly connected to the vehicle roof 3 and/or to the roof body 9 of the motor vehicle 1 in a form-fitting, force-fitting and/or integrally bonded manner in order to form a secure support of the safety device on the motor vehicle 1. The second crossmember 14 is configured to be moved along the lower side of the roof element 5 by means of a drive means 20 and to unfold or to spread out the safety element 12.

The drive means 20 comprises two cylinders 22, two piston rods 21, a pipe system 23 for conducting gas and a gas unit 25 for providing and releasing gas. The piston rods 21 are each connected at one end to the second crossmember 14 and are coupled to the safety element 12 and are coupled at the respective other end to an associated cylinder 22. The pipe system 23 is coupled firstly to the cylinders 22 and secondly to the gas unit 25. By release of gas by means of the gas unit 25, the safety element 12 can be moved from the first state into the second state and can be spread open promptly and reliably under the roof element 5 or the roof opening.

The piston rods 21 each have a disc-shaped piston 24 which extends into the respective cylinder 22. The respective piston rod 21 is configured in such a manner that, in the retracted first state of the safety element 12, the associated piston 24 extends into the cylinder 22 to such an extent that the piston 24 is arranged behind a coupling intersection between the pipe system 23 and the cylinder 22. In other words, the piston 24 is always spaced further apart from the crossmembers 13 and 14 than the coupling intersections of the pipe system 23 to the respective cylinders 22.

The gas unit 25 can comprise, for example, a gas container 26 which is filled with compressed gas or gas mixture which is released in the event of an accident of the motor vehicle 1 and fed into the pipe system 23.

The gas flowing through the pipe system 23 enters the cylinders 22 and drives the pistons 24 in the cylinders 22 in front of it. Accordingly, the piston rods 21 are pulled into the cylinders 22 and the safety element 12 coupled thereto is spread open. Alternatively or additionally, the gas unit 25 can have a pyrotechnic gas generator 26 which by priming by means of a primer in the event of an accident provides a gas or gas mixture for moving the safety element 12 and is fed into the pipe system 23.

The drive means 20 furthermore comprises a plurality of gas valves 27 which realize a respective throttle function and permit a controlled gas flow and secure spreading out of the safety element 12.

Furthermore, the safety device has a receiving unit 15 which comprises a crossmember 17 and a plurality of clamp-shaped fixing elements 18 which are arranged on the crossmember 17. The fixing elements 18 are designed to secure the safety element 12 in a stable and reliable manner in the second, extended state in order to form a reliable support for a body striking against the safety element 12. For this purpose, the crossmember 17 and the fixing elements 18 are arranged opposite the first crossmember 13 in the region of an axial end of the cylinder 22 and are designed in a manner coordinated with an extended position of the safety element 12.

The safety element 12 is configured, for example, as a textile mesh and, in the first state, is folded up between the first, fixed crossmember 13 and the second, moveable crossmember 14. Such a pack comprising the safety element 12 and the crossmembers 13 and 14 is preferably arranged in a manner oriented transversally with respect to a longitudinal direction of the vehicle and is accommodated, for example, with respect to the roof element 5 in the form of a sliding roof either in front of or behind the associated roof opening below the roof surface in the vehicle interior.

It is assumed below that the roof element 5 is arranged as a sliding roof, the safety element 12 as a mesh and the described pack with respect to an orientation according to the operation of an operationally ready motor vehicle 1 below the roof opening of the sliding roof. According to a correspondingly alternative orientation, the following details would be reversed with respect to a longitudinal axis of the vehicle.

The front, first of the two crossmembers 13 is fixedly connected to the roof skin or to the roof body 9 of the motor vehicle 1. The rear, second of the two crossmembers 14 is connected to the two piston rods 21 which extend rearward in the direction of travel and lead into the pneumatic cylinders 22. When the pneumatic cylinder 22 is acted upon with gas pressure, the piston rods 21 are pulled rearward into the cylinders 22 such that the rear crossmember 14 is pulled as far as the rear end of the roof opening, the mesh spreads out and closes or covers the roof opening with the mesh.

The crossmember 17 of the receiving unit 15 is located at the rear end of the roof opening, said crossmember being fixedly connected to the roof skin or to the roof body 9 of the motor vehicle 1. Said crossmember 17 is located shortly behind the end position of the second crossmember 14 with respect to the second state of the safety element 12, in which the mesh is spread out. The fixing elements 18 are attached to the crossmember 17 of the receiving unit 15 in the form of C-shaped clips which can receive the second crossmember 14 in its end position when the mesh is tensioned. Said clips preferably have insertion slopes so that the second crossmember 14 can pass into the interior of the C-shaped fixing elements 18 even in the event of a slightly eccentric approach. Furthermore, it is advantageous that the C-shaped clips each have barbs with a wedge-shaped run-on slope, by means of which said barbs can be bent to the side by the approaching second crossmember 14, or the clip can be bent up to an extent sufficient such that the second crossmember 14 can pass into the respective clips and latches into place.

After the end position is reached, the respective barb or the clip springs back and forms a steep rear edge which blocks the path back out of the clip for the second crossmember 14 received. During striking of an object or a body against the mesh, the arising forces are thereby conducted directly into the body of the motor vehicle 1 by means of the first crossmember 13 and by means of the crossmember 17 of the receiving unit 15 and further elements of the present kinematic arrangement are relieved of load.

The fixing elements 18 are manufactured, for example, from aluminium and have a certain flexibility for receiving and latching the second crossmember 14 into place. Alternatively, the fixing elements 17 are manufactured from steel and each have, for example, a spring-loaded block or pin which realizes a latching mechanism and permits reliable and secure holding of the second crossmember 14 and a stable maintaining of the tensioned mesh.

The gas unit 25 comprises, for example, a gas cylinder 26 filled with compressed carbon dioxide, or a pyrotechnic gas generator 26, which gas cylinder or which gas generator is connected to the two cylinders 22 via gas lines of the pipe system 23. Either, a primer is provided for the pyrotechnic gas generator 26 or a switchable gas valve 27 which, in the event of an accident, releases the path for the expanding gas into the gas lines and to the cylinders 22 in an electronically controlled manner. After the release by the primer or the gas valve or the gas valves 27, the closing and locking of the mesh proceeds automatically at a high speed. Two further gas valves 27 limit the gas flow speed to a relatively uniform extent and thus ensure that the movement paths of the two piston rods 21 into the respective cylinders 22 are synchronized. Tilting of the structure can thereby be prevented or such can thereby be at least opposed.

Furthermore, the arrangement 10 can also have additional guide elements for the secure and directed guidance of the lateral edges of the mesh and of the second crossmember 14, said guide elements being configured, for example, as laterally running rails.

The piston rods 21 can also be configured flexibly or designed as ropes or cables, and therefore a risk of tilting is reduced further. In addition, the arrangement 10 cannot be oriented along the direction of travel, but rather transversally with respect thereto, and therefore the safety element 12 is moveable, for example, from an upper region of a side window of the front passenger in the direction of the side window of the driver. When the piston rods 21 are realized in the form of ropes and said ropes are deflected by means of deflection pulleys, the pistons 22 could be accommodated equally in the longitudinal or transverse direction in or on the vehicle roof 3 or at another suitable point.

Furthermore, the bringing together of two ropes instead of the piston rods 21 via two deflection pulleys to form a cylinder 22 is also possible, and therefore, the movement would be fully synchronized. Rolling up said ropes by means of a gas motor would also be a possibility for unfolding the safety element 12. Furthermore, movement of the safety element 12 by spring force or electric motor would also be possible.

The described arrangement 10 makes it possible to realize a safety system for a motor vehicle 1, which contributes to increased safety for vehicle occupants of the motor vehicle 1. Such a safety system can also be arranged on existing vehicle roofs or in existing motor vehicles with a corresponding roof element 5, and therefore, by means of retrofitting with the arrangement 10, safety of the respective motor vehicle can be increased.

LIST OF REFERENCE SIGNS

1 Motor vehicle
3 Vehicle roof
5 Roof element
7 Roof frame
9 Roof body
10 Arrangement
12 Safety element
13 First crossmember
14 Second crossmember
15 Receiving unit
17 Crossmember of the receiving unit
18 Fixing elements of the receiving unit
20 Drive means
21 Piston rod
22 Cylinder
23 Pipe system
24 Piston
25 Gas unit
26 Gas container/gas generator
27 Gas valve

The invention claimed is:

1. An arrangement for a vehicle roof, comprising: a roof element coupleable to a roof body of a motor vehicle and permits a view through the vehicle roof, and a safety device which is assigned to the roof element and has a safety element and also a drive which is configured to move the safety element relative to the roof body and to transfer same from a first, retracted state, in which the safety element is stowed in a predetermined manner, into a second, extended state, in which the safety element covers a predetermined surface portion on a lower side of the roof element and opposes penetration of a body through the roof element;

wherein the safety device has a receiving unit which comprises a crossmember that is aligned transversely to a vehicle longitudinal axis and one or more fixing elements which are arranged on the crossmember and which are designed to secure the safety element in the second, extended state; and the cross member and the one or more fixing elements are configured such that during striking of an object or a body against the safety element, the arising forces are thereby guided directly into the body of the motor vehicle.

2. The arrangement according to claim 1, wherein the safety element is designed as a mesh or a fabric element.

3. The arrangement according to claim 2, wherein the mesh or the fabric element contains metal wires, carbon fibers and/or plastics fibers.

4. The arrangement according to claim 1, wherein the safety device is configured to be fixedly connected to the roof body of the motor vehicle in a form-fitting, force-fitting and/or integrally bonded manner.

5. The arrangement according to claim 1, wherein the safety device has a first crossmember and a second crossmember, between which the safety element is arranged and is in each case coupled by a respective end to one of the crossmembers, wherein the first crossmember is configured to be fixedly connected to the roof body of the motor vehicle in a form-fitting, force-fitting and/or integrally bonded manner, and the second crossmember is configured to be moved along the lower side of the roof element by the drive.

6. The arrangement according to claim 1, wherein the drive comprises a cylinder, a piston rod, a pipe system for conducting gas and a gas unit for providing and releasing gas, wherein the piston rod is coupled at one end to the safety element and at the other end to the cylinder, and wherein the pipe system is coupled on one side to the cylinder and on the other side to the gas unit such that, by release of gas by the gas unit, the safety element can be moved from the first state into the second state.

7. The arrangement according to claim 6, wherein the gas unit comprises a gas container with compressed gas and/or a pyrotechnic gas generator.

8. The arrangement according to claim 1, wherein the roof element is designed as a fixedly installed glass and/or plastics skin or is designed as a displaceable cover which is movable relative to the safety device in order to selectively close or open up a roof opening in the vehicle roof.

9. A vehicle roof for a motor vehicle, comprising: an arrangement according to claim 1 which is arranged on a lower side of the vehicle roof.

10. A motor vehicle, comprising: a vehicle roof, and an arrangement according to claim 1 which is coupled to a roof body of the motor vehicle.

\* \* \* \* \*